United States Patent
Doty et al.

[19]

[11] Patent Number: 6,005,241
[45] Date of Patent: Dec. 21, 1999

[54] SEAT BELT RESTRAINT SYSTEM

[75] Inventors: Gerald Arthur Doty, Crown Point, Ind.; Richard M. Grabowski, Davisburg, Mich.; Erick Michael Anderson, Lake Orion, Mich.; Mark Lynn Wilsey, Howell, Mich.

[73] Assignee: Takata Corporation, Auburn Hills, Mich.

[21] Appl. No.: 08/957,470

[22] Filed: Oct. 24, 1997

[51] Int. Cl.$^6$ .................................................. G01D 5/30
[52] U.S. Cl. ............................... 250/222.1; 250/231.1; 73/514.26
[58] Field of Search ................................ 250/221, 222.1, 250/231.1; 73/514.01, 514.19, 514.26; 180/282; 280/802, 805, 806, 807

[56] References Cited

U.S. PATENT DOCUMENTS

| | | |
|---|---|---|
| 2,263,228 | 11/1941 | Wolff et al. . |
| 2,771,597 | 11/1956 | Freedman . |
| 3,807,522 | 4/1974 | Becker . |
| 3,909,780 | 9/1975 | Huffman . |
| 3,915,401 | 10/1975 | Takata . |
| 3,934,671 | 1/1976 | Hart . |
| 3,967,135 | 6/1976 | Balban et al. . |
| 4,083,254 | 4/1978 | Nissl . |
| 4,158,191 | 6/1979 | Rogers et al. . |
| 4,235,455 | 11/1980 | Collins et al. . |
| 4,477,732 | 10/1984 | Mausner . |
| 4,608,469 | 8/1986 | Doty . |
| 4,703,950 | 11/1987 | Pickett . |
| 4,708,364 | 11/1987 | Doty . |
| 4,708,366 | 11/1987 | Doty . |
| 4,737,630 | 4/1988 | Andersson . |
| 4,741,491 | 5/1988 | Andersson et al. . |
| 4,749,212 | 6/1988 | Ueda et al. . |
| 4,754,105 | 6/1988 | Doty et al. . |
| 4,763,926 | 8/1988 | Doty . |
| 4,796,916 | 1/1989 | Rogers et al. . |
| 4,832,365 | 5/1989 | Kawai et al. . |
| 4,896,741 | 1/1990 | Kawai et al. . |
| 4,988,862 | 1/1991 | Beltz . |
| 5,013,909 | 5/1991 | Sondergeld et al. . |
| 5,037,133 | 8/1991 | Kataoka et al. . |
| 5,088,769 | 2/1992 | Furuhashi . |
| 5,291,014 | 3/1994 | Brede et al. . |
| 5,490,069 | 2/1996 | Gioutsos et al. . |
| 5,490,575 | 2/1996 | Suran et al. . |
| 5,496,979 | 3/1996 | Behr . |
| 5,502,301 | 3/1996 | Lord . |
| 5,520,263 | 5/1996 | Suran et al. . |
| 5,596,382 | 1/1997 | Bamford ................................. 396/429 |
| 5,744,872 | 4/1998 | Carlo et al. ........................... 250/231.1 |
| 5,788,281 | 8/1998 | Yanagi et al. ............................. 280/806 |
| 5,902,999 | 5/1999 | Yanagi et al. ......................... 250/231.1 |

FOREIGN PATENT DOCUMENTS

| | | |
|---|---|---|
| 3629316 A1 | 3/1988 | Germany . |
| 1 583 443 | 1/1981 | United Kingdom . |

*Primary Examiner*—John R. Lee
*Attorney, Agent, or Firm*—Fitch, Even, Tabin & Flannery

[57] ABSTRACT

A seat belt restraint system is provided including a retractor and an optical inertia sensor therefor. The optical inertia has a sensor body with a light emitter and detector recessed in bores therein. A frame support having inclined walls with a base opening at the bottom of the walls support an inertia ball so that it is positioned at the opening to reflect light from the emitter to the detector when vehicle accelerations are within a predetermined range. The inertia sensor is incorporated into circuitry which controls a locking mechanism, e.g. solenoid, at the retractor so that when the detector is sensing light, the retractor stays unlocked. During excessive vehicle acceleration, such as brought on during accident conditions, the ball will roll along the wall so it no longer reflects light from the emitter breaking optical communication between the emitter and detector and locking the retractor. The optical inertia sensor is advantageous in that it uses very few moving parts in contrast to mechanical remote sensors and avoids the reliability problems faced by switch contacts in prior inertia sensors. In addition, the sensor body including the emitter and detector is a commercially available portion of the sensor which utilizes well proven optical components for good reliability in sensor operation and lower costs in fabricating the present sensor.

19 Claims, 4 Drawing Sheets

SEAT BELT RESTRAINT SYSTEM

FIELD OF THE INVENTION

The invention relates to a seat belt restraint system, and more particularly, to a seat belt retractor having an optical inertia sensor therefor.

BACKGROUND OF THE INVENTION

In many seat belt restraint systems employed in automotive vehicles, the retractors for the seat belts have acceleration sensors for locking the retractor upon sensing high vehicle accelerations or decelerations such as caused by vehicle impacts during accidents. With respect to vehicle acceleration sensors, there is typically an inertia member that is responsive to excessive vehicle accelerations to cause a locking mechanism to block the retractor reel against rotation preventing seat belt payout therefrom. Normally, these sensors are incorporated into the retractor. When the retractor is mounted to a vehicle seat, and particularly to an adjustable backrest thereof, the inertia sensing portion of the acceleration sensor may have to be adjusted in its position to avoid a premature actuation locking the retractor when the seat back is adjusted due to the sensitivity of the inertia member to changing attitudes.

Rather than adjusting the inertia sensor on a tiltable seat backrest, remote acceleration sensors have been mounted in the vehicle at a remote location from the adjustable backrest to which the retractor may be attached. The acceleration sensing mechanism for these remote sensing units can be of the standard mechanical type where inertia members topple or roll in response to high accelerations or decelerations causing a lock bar or pawl to engage teeth on a gear or ratchet wheel to stop reel rotation.

Where the retractor is electrically controlled for locking, such as by a solenoid device, it is known to use electrically conductive inertia members which move to close switch contacts during periods of high acceleration or deceleration. Examples of such electrically controlled remote sensors are shown in U.S. Pat. Nos. 3,915,401 and 4,708,366. While electrical inertia sensors or switches that employ switch contacts for electrically controlling operation of a retractor solenoid typically use less moving parts over mechanical sensors, they can experience problems with respect to their reliability and service life when the switch contacts are subjected to adverse environmental conditions, such as dust, temperature extremes and excessive humidity. Dust or corrosion may cause moving parts in a switch to bind to prevent opening or closing thereof, or may interrupt current flow between the contacts. In addition, over time switch contacts can wear or corrode which can adversely affect their performance. This is undesirable because, to meet automotive manufacturers' specifications, the switch must be cycled thousands of times under these adverse conditions without failure. Accordingly, the use of electrical switch contacts in inertia sensors can create problems in terms of the reliability of operation and the service life of the sensor, both of which take on critical importance due to their safety implications when employed in safety belt restraint systems.

Other important considerations that arise when selecting an inertia sensor for use in automobiles are the assembly and production costs of the sensor. In addition, the remote sensor should have a compact design so as to take up a minimum amount of space. As previously mentioned, this is particularly important with remote sensors so that they occupy as little space as possible wherever they are mounted in the vehicle interior. Accordingly, a retractor having an inertia sensor, and specifically a remote inertia sensor that avoids the use of moving switch contacts and which meets the severe operational requirements imposed by the automobile industry is desirable. The acceleration sensor must meet rigid life testing specifications and hence it should employ very reliable components. In addition, a low cost, readily assembled, compact inertia sensor that also satisfies the long life and reliability criteria would be desirable.

SUMMARY OF THE INVENTION

In accordance with the present invention, a seat belt restraint system is provided that includes a retractor and an optical inertia sensor associated therewith. The preferred optical sensor utilizes a commercially available light sensor and detector and has an inertia member with a reflective surface for reflecting light from the emitter to the detector when the vehicle acceleration or deceleration is within a predetermined range. A support frame supports the inertia member for movement during excessive accelerations/decelerations to shift the reflective surface so that it no longer reflects light to the detector. An electrical circuit is operable by the light detector for activating the retractor locking mechanism when the vehicle acceleration/deceleration exceeds the predetermined range limits. As is apparent, the present retractor utilizes an optical inertia sensor which avoids the use electrical contacts and the associated problems therewith. The optical sensor employs conventional emitters and detectors that have been proven for their reliability so as to readily meet the strict specifications of the automotive industry and which do not face the same kinds of problems if exposed to the environment as do electrical contacts.

In one form of the invention, a seat belt retractor for a vehicle is provided having a locking mechanism and including an optical inertia sensor which controls the retractor locking mechanism for locking the retractor against belt protraction. The retractor includes a housing for the inertia sensor which is mounted in the vehicle. A sensor body is contained in the housing and a light emitter is mounted to the sensor body to emit light therefrom. The light detector is mounted to the sensor body to receive light from the emitter which is reflected thereto. An inertia member is provided that is responsive to inertia forces and has a reflective surface for reflecting light from the emitter to the detector when the inertia member is in a first position where vehicle acceleration or deceleration is within a predetermined range. A fixed support frame of the housing supports the inertia member for movement from the first position to a second position so that the reflective surface no longer reflects light to the detector. An electrical circuit is operable by the light detector for activating the retractor locking mechanism when the vehicle acceleration/deceleration exceeds the predetermined range limits. The optical inertia sensor herein is a significant improvement over prior conventional mechanical inertia sensors in that it has a reduced number of moving parts as only the inertia member moves when vehicle accelerations/decelerations are beyond those in a predetermined range. In addition, the sensor body having the emitter and detector is commercially available as a reflective object sensor so that separate fabrication of this portion of the sensor need not be undertaken by the restraint system provider which generally simplifies and lowers the overall expense associated with the manufacture of the optical inertia sensor utilized for the retractor herein.

In one form, the sensor body includes first and second bores each including a bore base recessed within the body and a top opening with the emitter mounted at the base of one of the bores to emit light in a first direction along the one bore and out from the top opening thereof. The detector is mounted at the base of the other bore so that with the inertia member in its first position, light is reflected from the inertia member reflecting surface in a second direction different from the first direction through the top opening of the other bore and to the detector at the base thereof. The location of the emitter and detector recessed deep at the bottom of bores in the sensor body minimizes exposure to the environment so as to further enhance the reliability of their operation. In addition, the bore walls provide somewhat of a collimation effect to light traveling therein which renders the detection of the collimated light more accurate, as sensing of diffracated light reflected off from the inertia member is reduced.

The preferred inertia member is highly reflective such as a bright or polished metal surface on a steel ball. A small hole in the bottom of a support for the ball provides a small area or spot for the light to have a small beam that hits the ball over a very small portion of the bottom of the ball. This small beam of incoming light at a first angle is then reflected back at a second angle from the ball through the hole to the light detector. When the ball rolls away from the hole, the incoming light scatters, disperses or diffuses inside of the support and does not form a reflected beam of sufficient intensity to actuate the light receptor portion of the optical switch.

Preferably, the support frame includes a base opening and inclined walls extending and tapering away from the opening. The sensor body is mounted in the housing so that the base opening is between the body and inclined wall with the first and second bores being inclined in the body towards each other so that axes extending along the first and second direction intersect approximately at the opening.

When the inertia element is a ball, the fixed support frame can include a cup-shaped portion having a substantially conical wall with the opening being very small compared to the size of the ball. The ball rests in the base opening at the bottom of the conical wall in the first position and rolls away from the opening along the wall in the second position.

With the above construction, the frame cup portion restrains the inertia member against movement at the bottom of the inclined wall of the conical cup portion at the base opening thereof during normal vehicle accelerations/decelerations, and when the acceleration/deceleration range limits are exceeded, the ball moves out from the base opening and begins to roll along the wall. Once the acceleration/deceleration falls back within the predetermined acceleration/deceleration range, the ball will roll back to the base of the cup without requiring biasing members or the like to return to its first reflecting position for reflecting light to the detector. The lack of biasing members in the present inertia sensor reduces the number of its parts and provides for simpler assembly thereof over prior optical inertia sensors which use biasing elements to urge inertia members that are moved in response to high acceleration/decelerations back into rest positions.

In the preferred form where the inertia member is a spherical ball, the base opening in the support frame can have a first predetermined diameter with the ball having a second predetermined diameter larger than the first predetermined diameter. The ratio of the first and second predetermined diameters and the angle of the inclined walls are selected to control the limits of the predetermined acceleration/deceleration range at which the ball begins to roll along the walls away from the opening to break optical communication between the emitter and detector.

Accordingly, frames with different conical surface inclinations and different sized base openings and/or different sizes of balls can be provided so as to allow the exact limits of the range of acceleration beyond which the retractor is locked to be selected by specifying and coordinating between the different frames and/or balls. This provides the inertia sensor herein with a very easy and precise way to control the points at which the retractor is locked against belt protraction when excessive vehicle accelerations/decelerations are encountered.

Preferably, the sensor is mounted in the vehicle at a remote location from a vehicle seat adjustable back rest to which the retractor is mounted so the sensor is not affected by changing inclinations of the back rest of the seat. Where in the preferred form the support frame includes a conical wall, the sensor housing is mounted in the vehicle remote from the vehicle seat so that the conical wall axis extends in a substantially vertical direction when the vehicle is on a relatively level surface.

In another form of the invention, a seat belt restraint system is provided having a solenoid associated with the retractor for allowing belt protraction from the retractor when the solenoid is energized by a control circuit of the retractor and locking the retractor against belt protraction when the solenoid is de-energized. A timer circuit signals the control circuit to energize the solenoid for a predetermined time sufficient for buckling and unbuckling of the seat belt about a passenger who is about to enter or leave the vehicle. A reflective inertia member in the sensor is located in a first position when the vehicle is within predetermined acceleration and deceleration limits. A light emitter is provided for emitting light in a first direction towards the inertia member so that the light will reflect off the inertia member when it in the first position. A light detector receives light reflected off the inertia member in a second direction to energize the solenoid for allowing belt protraction. When the vehicle exceeds the predetermined acceleration/deceleration range, the reflective inertia member shifts to break optical communication between the emitter and detector to de-energize the solenoid for locking of the retractor regardless of signalling from the timer circuit.

Preferably, the timer circuit signals the control circuit to energize the solenoid for belt protraction when either an ignition of the vehicle is turned on or off or a vehicle door adjacent the retractor is opened. A predetermined time is selected to allow the passenger entering the vehicle sufficient time to buckle the belt, and after the vehicle is turned off to allow the passenger to unbuckle the belt.

DETAILED DESCRIPTION OF THE PREFERRED EMBODIMENT

The present invention relates to a seat belt restraint system 5 including a retractor 10 and an inertia sensor 12 associated therewith for sensing excessive vehicle accelerations/decelerations and causing the retractor 10 to lock preventing belt payout therefrom. Herein, when the term acceleration is utilized, it will be understood that both vehicle acceleration and deceleration are encompassed thereby. In addition, it will be recognized that the retractor 10 can take on a variety of forms besides that of the illustrated retractor in FIG. 3 for use with the inertia sensor 12 herein. In the preferred form of the invention, the inertia sensor 12 is a remote inertia sensor in that it is not mounted within the retractor 10, and is instead located at some other position in the vehicle thus allowing the retractor 10 to be mounted to an adjustable backrest of a vehicle seat. In this manner, the changing inclinations of the backrest will not affect operation of the remotely positioned inertia sensor 12.

Figure 1:
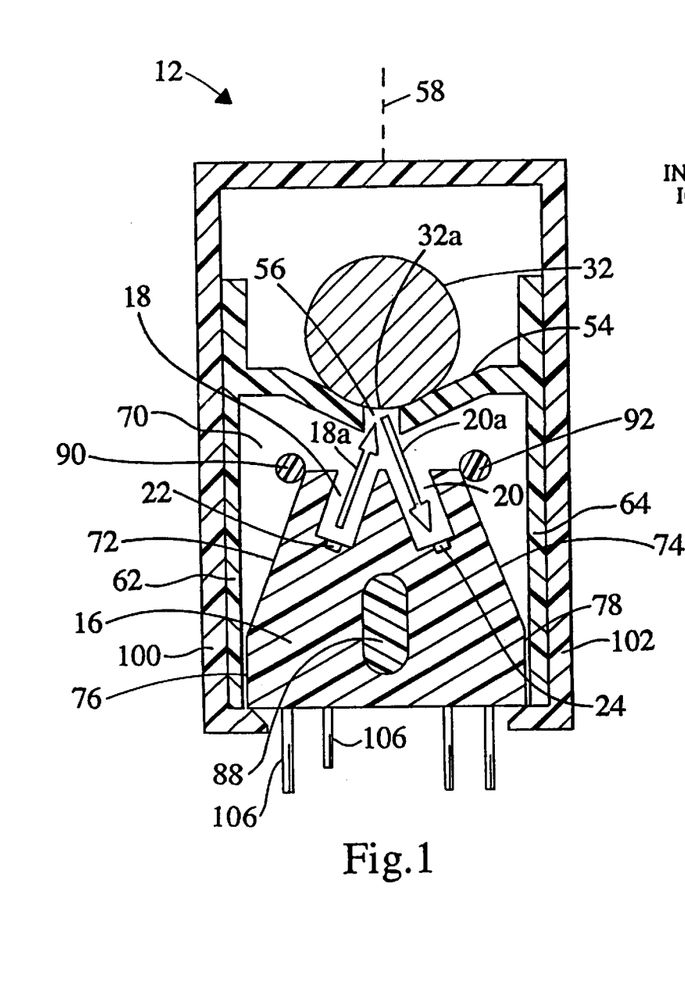
FIG. 1 is a sectional view of an optical inertia sensor for use with a seat belt retractor in a seat belt restraint system in accordance with the present invention showing a sensor body in a cover housing and having a light emitter and detector recessed in the sensor body, and a support frame for an inertia ball which can reflect light from the emitter to the detector.

The present inertia sensors 12 has a simple construction with a significantly reduced number of moving parts versus prior inertia sensors thus lowering its production costs and providing it with a relatively compact design. In particular, the preferred inertia sensor 12 herein utilizes a commercially available reflective object sensor, generally designated 14, obtained from Optek Technologies, Inc. in Carrollton, Tex. This is a highly reliable optical switch and has a long life needed for use in an acceleration sensor device. The reflective sensor 14 has a small low cost plastic sensor body 16 having a generally truncated triangular shape with converging bores 18 and 20 formed therein. In other words, the bores 18 and 20 are canted towards each other as they extend to the top of the body 16 so that their respective axes 18a and 20a will intersect at a point over the top of the body 16. The sensor body 16 includes a light emitter 22 recessed in bore 18 at the base thereof to emit light out from top opening 23 of the body 16. The sensor body 16 also includes a light detector 24 recessed in bore 20 at the base thereof which has light from the emitter 22 reflected thereto through top opening 25 of the body 16 adjacent body top opening 23 and down through the bore 20 to the detector 24 at the base thereof.

The preferred commercially available reflective object sensor 14 utilizes standard infrared emitting diodes as the light emitters 22 and NPN silicon photo-transistors as the light detectors 24 which are not affected by wearing and corrosion such as caused by humidity that can adversely affect operation of electrical switch contacts utilized in the previously discussed electrical switch inertia sensors. In addition, because the diodes and phototransmitters are recessed deep in bores 18 and 22 of the sensor body 16, their exposure to the environment is reduced. As the light emitter 22 and detector 24 can be well-known optical components which are proven for their reliability in operation, the present inertia sensor 12 can readily satisfy the strict automotive specifications required thereof and should generally have a long trouble-free service life.

Figure 4:
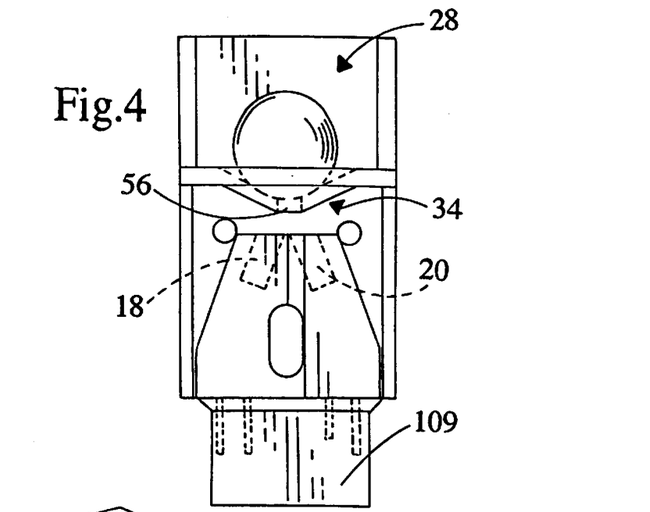
FIG. 4 is an elevational view similar to FIG. 1 with the cover housing removed for clarity and showing the optical inertia sensor electrically connected to a four pin electrical connector.
Figure 5:
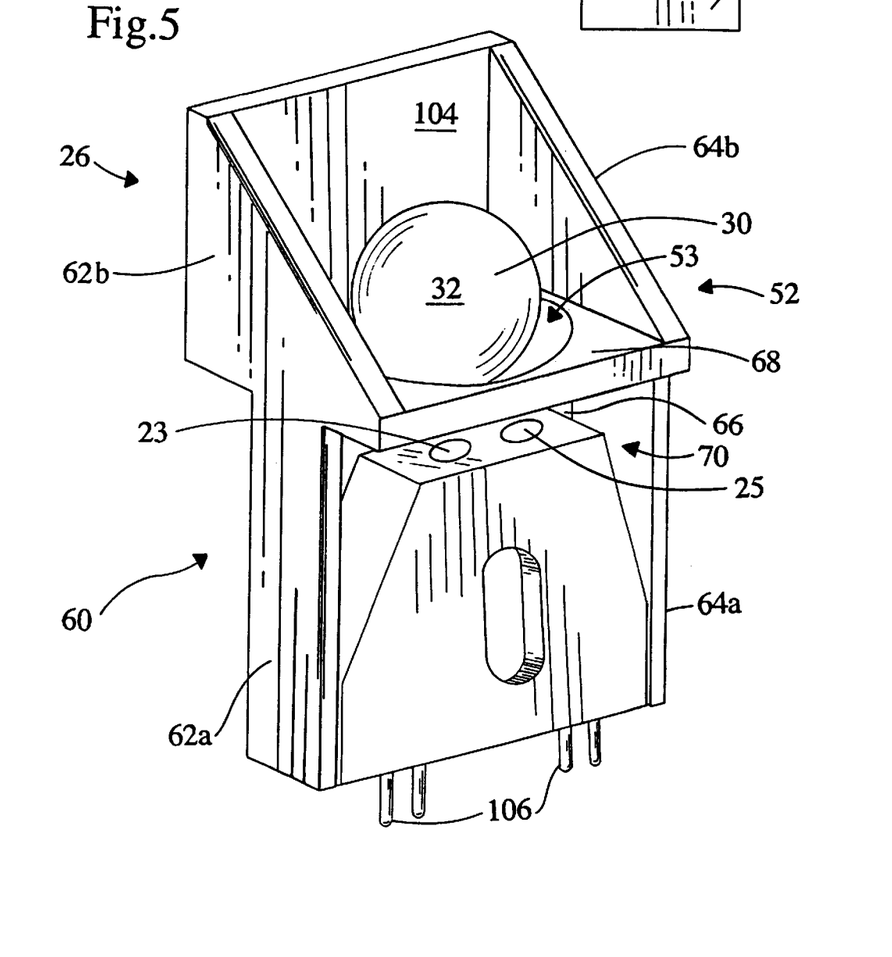
FIG. 5 is a perspective view of the optical inertia sensor less the cover housing similar to FIG. 4 and showing the inertia ball resting in a cup-shaped portion of the support frame.

Referring to FIGS. 4 and 5, the reflective object sensor 14 is mounted to a fixed support frame 26 that supports an inertia member 28, which is preferably a rolling inertia member such as in the form of spherical ball 30. The inertia member 28 is responsive to inertia forces caused by excessive vehicle acceleration so that it moves from a first reflecting position to a second non-reflecting position. More specifically, when the vehicle accelerations are within a predetermined range, the support frame 26 is operative to keep a reflective surface of the inertia member 28, which preferably is a very small spot or area on the large spherical surface 32 of the inertia ball 30, in its first position so that light from the emitter 22 reflects off the surface 32 to the detector 24. The ball rests on inclined walls 34 of the support frame and covers a small circular opening 56 at the bottom of the inclined walls. The light in the form of a small beam travels along the axis 18a to the aligned opening 56 and hits a small spot or area 32a on the bottom of the ball and covering the opening 56. The traveling light beam is reflected back as reflected beam along the axis 20a to the detector 24. Thus, the light is not scattered, diffused or otherwise so diminished within the support until the ball rolls to uncover the opening 56. When the vehicle acceleration exceeds the limits of the predetermined acceleration range, the inertia member 28 will move or roll along inclined wall 34 of the frame 26 to its second non-reflecting position so that the inertia member reflective surface 32 no longer reflects light to the detector 24 breaking optical communication between the emitter 22 and detector 24. As previously mentioned, the retractor 10 is locked when the inertia sensor 12 detects excessive accelerations as when the inertia element 28 has shifted to its second position.

Figure 3:
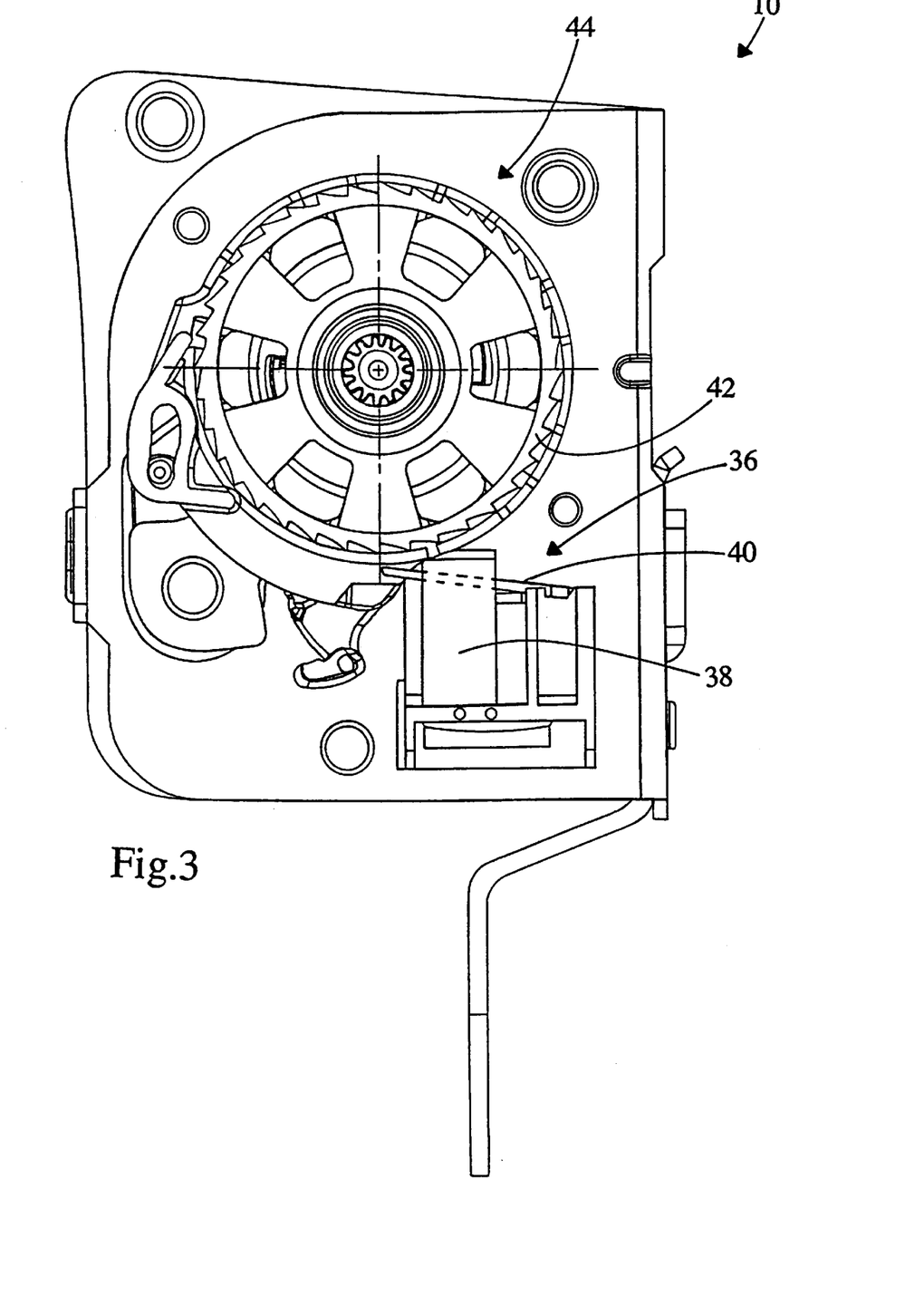
FIG. 3 is an elevational view of a retractor having a solenoid locking mechanism for locking the retractor against belt protraction.

For locking of the retractor 10, the retractor includes a locking mechanism 36 which in the preferred form is an electrically controlled solenoid 38 that when energized keeps a pivotally mounted locking pawl 40 away from rotating teeth 42 of the retractor reel 44. When the current to the solenoid 38 is interrupted, the de-energized solenoid 38 allows the pawl 40 to shift into engagement with the teeth 42 stopping rotation of the reel 44 and belt payout therefrom.

Figure 2:
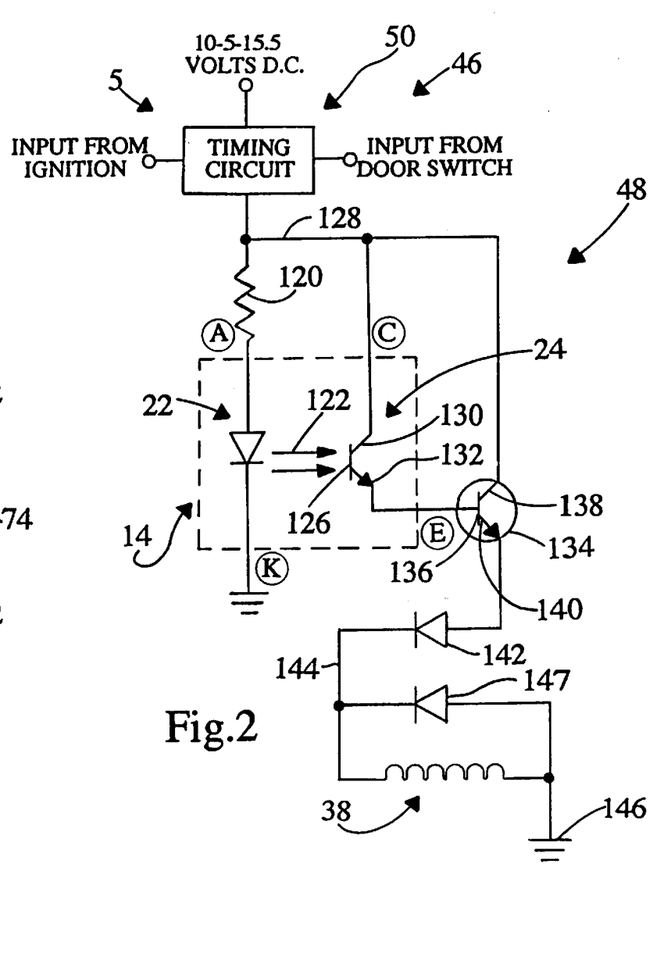
FIG. 2 is a schematic diagram of the seat belt restraint system circuitry showing input from a timing circuit being provided to a control circuit for the retractor incorporating the optical sensor therein.

To control the current flow to the solenoid 38, the seat belt restraint system 5 can include an electrical circuit 46, as shown in the schematic diagram of FIG. 2. The reflective object sensor 14 is incorporated into a control circuit portion 48 of the circuit 46 which controls the current supply to the solenoid coil 38. The control circuit 48 is designed so that when the light detector 24 senses light from the emitter 22, the current flows to the solenoid coil 38 keeping it energized, allowing belt protraction from the retractor reel 44. When optical communication between the emitter 22 and the detector 24 is broken as by movement of the inertia element 28 to its second position along the inclined wall 34, the solenoid 38 no longer receives current from the control circuit 48 so that the solenoid 38 no longer keeps the pawl 40 disengaged from the reel teeth 42 blocking rotation of the reel and belt protraction therefrom. In this manner, the light detector 24 of the electrical circuit 46 activates the retractor locking mechanism 36 when the vehicle acceleration exceeds the predetermined range limits. In addition, because the retractor reel 44 is blocked from rotation when the solenoid 38 is de-energized, if for any reason the current to the solenoid is interrupted such as by component failure, power failure, power disconnection due to an accident, etc., the retractor will lock rendering the system fail-safe.

The electrical circuit 46 of the restraint system 5 herein preferably also includes a timing circuit portion 50 which utilizes the vehicle battery as its power supply, and has independent inputs from the vehicle ignition and a door switch utilized in the door adjacent to the vehicle seat to which the retractor 10 is mounted. The timer circuit portion 46 provides current to the control circuit portion 48 which, in turn, energizes the solenoid 38 when the vehicle acceleration is within the predetermined range. The timer circuit portion 46 signals the control circuit 48 to energize the solenoid 38 for a predetermined time sufficient to allow manipulation of the seat belt including protraction from the reel 44 for buckling and unbuckling of the seat belt about a passenger who is about to enter or leave the vehicle. Thus, when the door having the door switch is opened, the timer circuit 50 signals the control circuit 48 so that current is timed and supplied for the predetermined time, e.g., three minutes, and is then turned off. The circuitry 46 is designed so that if during this predetermined period, the ignition is energized, the current will not be interrupted. In addition, as long as the ignition remains on, there will be a continuous supply of current to the control circuit 48 keeping the retractor 10 unlocked, unless excessive acceleration is detected which would cut off current to the solenoid 38, as previously described. When the ignition is switched off, current again is supplied to the control circuit 48 from the timing circuit 46 for the predetermined time set to allow the occupant to protract belting off of the reel 44 if necessary for unbuckling of the belt from about themselves to exit the vehicle. Once the current times out, the electrical circuit 46 will no longer draw from the vehicle's battery so as to conserve its capacity.

Referring now to FIG. 2, and as set forth above, the circuit 46 includes the timing circuit 50 as stated above. The circuit 46 receives an input from the ignition switch. The ignition switch signal indicates whether the ignition circuit of the car has been enabled. A signal from the door switch causes the timing circuit to begin supplying current to a current-limiting resistor 120 which supplies current to the light emitting diode 22. The current limiting resistor 120 limits the maximum amount of current which can be supplied to the grounded light emitting diode 22 to prevent it from being damaged.

When current is supplied by the timing circuit through the resistor 120 and through the light emitting diode 22 the light emitting diode 22 generates a beam of light 122 along the axis 18a. The light beam 122 is incident on the ball when the ball is in its rest position. When the ball is in its rest position it reflects the light which is then received by the NPN phototransistor 24 at a photosensitive base 126. The phototransistor 24 is coupled to receive collector biasing current from a line 128 which receives current from the timing circuit 50 and is enabled thereby. A voltage from line 150 is supplied to a collector 130 of the phototransistor, and when the phototransistor is conducting having received light 122 to its base 126 current flows out of its emitter 132 into a second transistor 134.

The transistor 134 is a NPN transistor having a base 136, a collector 138 and an emitter 140. The base 136 receives all of the emitter current 132 and when receiving such current biases the transistor 134 on to supply current to a diode 142. The diode 142 further supplies current to a line 144 which is coupled to the solenoid 38. The solenoid 38 is also grounded at a ground 146. Thus, when the timing circuit times out and provides energizing current to the photodetecting circuit light emitting diode 22 generates light. The light switches on the phototransistor 24, which switches on the NPN phototransistor 134 supplying current to the solenoid 38 and unlocking the seat belt locking device. The diode 142 acts as a protective diode for the NPN transistor 134 to prevent it from being accidently back-biased when current is interrupted to the solenoid 38. A shunt diode 146 is connected across the diode 138 back-biased to the diode 142 and provides a current path for decay current from the solenoid 38 when current is interrupted thereto.

In normal operation, after the timing circuit has enabled the motion sensing circuit when the ball 32 is moved, a portion, if not all of the light 122, is received along path 18a. All of the light, however is not reflected along path 20a to the phototransistor 24. As a result, the reflective base bias at the phototransistor base 126 drops limiting if not shutting off the emitter 132. This removes the base bias from the transistor 134 and interrupts the current flow through the solenoid 38. If there is a rapid interruption of current flow as a result of high acceleration the transistor 134 is protected from damage by the back-biasing effect of the diode 142 and by the shunt diode 146.

It may be appreciated that the circuit is highly sensitive to changes in motion and yet has a simple mechanical structure due to the use of the transistors 24 and 134. The transistors provide relatively high amplification for relatively small changes in the light input which, is related to the reflector. In addition, the shunt diode 146 allows the current in the solenoid 38 to decay rapidly without damaging the circuit to provide rapid locking it operation the circuit when the ball 32 is accelerated in respect to the vehicle due to a collision or other impacts or inertia loading.

As previously mentioned, in the preferred and illustrated form, the reflective object sensor 16 is mounted to a fixed support frame 26 having inclined walls 34 for supporting the inertia member 28 in its first reflecting position when vehicle accelerations are within a predetermined range and allowing the inertia member 28 to break optical communication between the emitter 22 and detector 24 when the vehicle accelerations exceed the predetermined range. The inclined walls 34 of the fixed support frame 26 can be provided on an upper frame portion 52. The frame upper portion 52 has a cup-shaped portion 53 with a conical surface 54 and a base opening 56 at the bottom of the surface 54. The base opening 56 is sized so that when the inertia ball 32 is resting at the bottom of the conical wall 54 in the base opening 56, a very small portion 32a of the spherical reflective surface 32 will be exposed to the light emitted from the light emitter 22 out from sensor body bore 18 for reflection therefrom into the bore 20 towards the detector 24 recessed therein.

Accordingly, the proper alignment of the sensor body 16 relative to the support frame 26 is important so that the axes of the converging bores 18 and 20 intersect beyond the top of the sensor body 16 at the frame base opening 56 to ensure that when the vehicle is within its predetermine acceleration range, light from the emitter 22 travelling in a direction along the bore axis 18a reflects off the small spot 32a on the reflective surface 32 exposed through the base opening 56 in a different direction along the bore axis 20a to the detector 24 keeping the solenoid 38 energized.

With the present optical inertia sensor 12 changing the limits of the acceleration range involves varying the point at which the ball 30 begins to roll along the conical surface 54 away from the opening 56 so that optical communication between the emitter 22 and deflector 24 is broken. To vary this point, the size of the opening 56 relative to the ball 30 and the inclination of the surface 54 can be altered. As the ratio between the diameters of the ball 30 relative to the opening 56 increases and/or the inclination of the surface 54 decreases, the predetermined acceleration range will be narrowed so that retractor locking will occur sooner at lower thresholds of accelerations or decelerations. In other words, making the ball 30 larger relative to the opening 56 or decreasing the wall slope will allow the ball to begin rolling at lower accelerations. Conversely, decreasing the diameter ratio between the ball 30 and opening 56 and/or increasing the inclination of the surface 54 will broaden the range so that locking of the retractor 10 will occur at higher sensed accelerations or decelerations.

Thus, it is important to accurately align the reflective objective sensor 14 with respect to the fixed support frame 26, and the sensor 12 should be mounted so that the axis 68 of the conical wall 54 extends substantially vertically when the vehicle is on a relatively level surface. Any misalignment could vary the preset points at which the optical communication between the emitter 22 and detector 24 is to be broken. This could lead to either premature or late locking of the retractor, both of which are undesirable from a passenger comfort standpoint with respect to the former, and in terms of passenger safety as to the latter.

The construction of the inertia sensor 12 will next be more specifically described. The fixed support frame 26 includes a lower sensor body mounting portion 60 below the upper frame portion 52. The frame 26 includes opposite side guide walls 62 and 64 which extend perpendicular out from side edges of back wall 66 at their lower sections 62a and 64a in the frame lower portion 60. The frame upper portion 52 has a transverse ledge wall 60 including the cup-shaped portion 53 and is connected at the upper end of the back wall 66 with the upper sections 62b and 64b of the side walls 62 and 64 of the frame upper portion 52 extending up perpendicular to the ledge wall 60. The upper guide wall sections 62b and 64b have a triangular shape as can be seen in FIG. 5 so as to allow the inertia ball 32 to be readily accessed when the frame 26 is removed from housing cover 94, which will be described hereinafter. The ledge wall 60 extends rearwardly beyond the back well 66 and forwardly beyond the guide wall lower sections 62a and 64a. The conical wall 54 extends downwardly into the space 70 defined by the guide wall lower sections 62a and 64a and back wall 66.

As previously described, the sensor body 16 has a generally triangular shape with inclined converging surfaces 72 and 74 extending up and toward each other from the top of respective lower vertical side surfaces 76 and 78. Upper surface 80 having adjacent top bore openings 23 and 25 formed therein extends across the top of the body 16 between the upper ends of the inclined surfaces 72 and 74 and front and back surfaces 82 and 84 of the body 16.

As previously mentioned, alignment between the various components of the sensor 12 is important for accurate setting of the predetermined accelerations at which the retractor 10 will lock. In this regard, the sensor body 16 has a generally oblong shaped mounting aperture 86 extending from the front surface 82 to the back surface 84 thereof for receiving a cooperating projection 88 which is similarly shaped and is formed on the frame back wall 66. To mount the sensor body 16 to the support frame 26 in the area 70 of the lower portion 60 thereof, the projection 88 is inserted into the sensor body aperture 86 with the non-circular oblong shape of the aperture 86 and mating projection 88 preventing rotation of the sensor body 16 relative to the frame 26. The spacing between the side guide walls 62 and 64 of the frame lower portion 60 is only slightly greater than the spacing between the lower vertical side surface 76 and 78 so that the sensor body 16 will be tightly received and guided into the area 70 by the guide walls 62 and 64 as the projection 88 is inserted into the central body aperture 86. To ensure for positive alignment of the sensor body 16 when mounted to the frame lower portion 60, locating pin members 90 and 92 can be provided extending in the area 70 out from the back wall 66 of the frame lower portion 60. The pins 90 and 92 are spaced at a distance substantially the same as the distance across the body top surface 80. Thus, the frame lower portion 60 includes guide walls 62 and 64, projection 88, and pins 90 and 92 all which serve to locate and accurately align the sensor body 16 in the lower body portion area 70 below the upper cup portion 52 thereof while also preventing the body from rotating or rattling relative to the frame 26 during operation of the vehicle.

Figure 6:
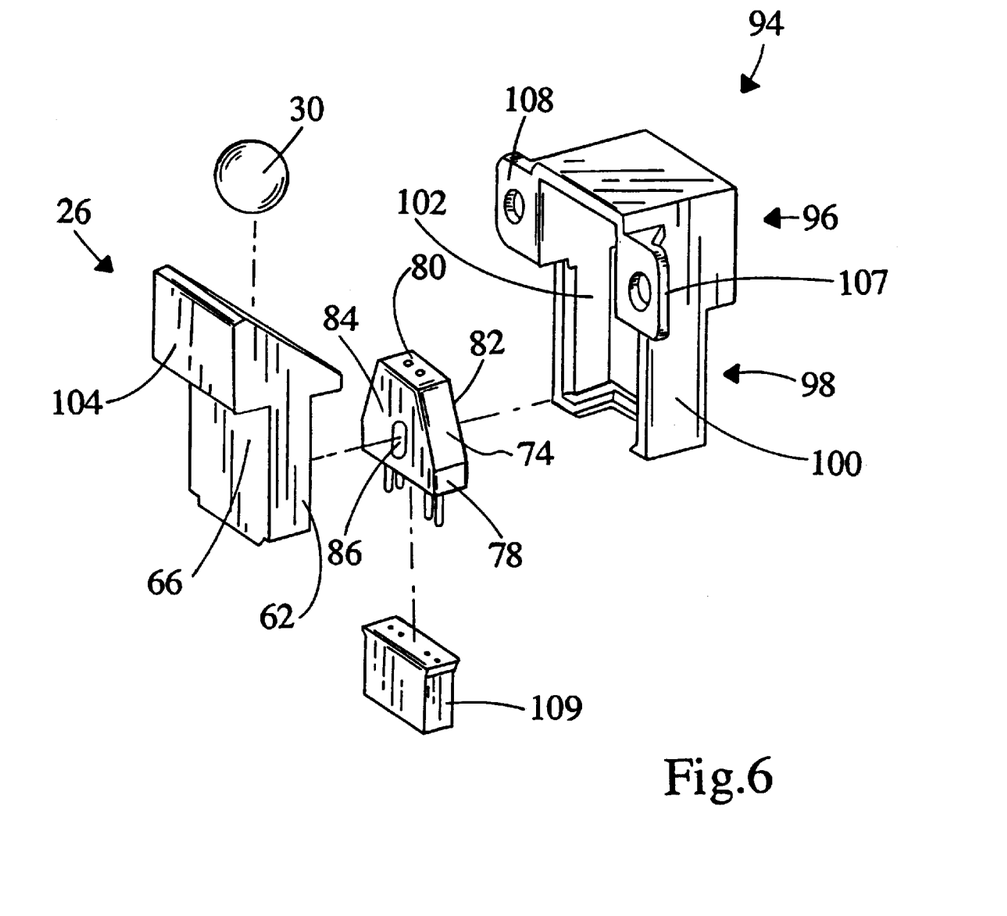
FIG. 6 is an exploded view of the optical inertia sensor including the sensor housing, the support frame and inertia ball, the sensor body and the electrical connector for being connected to the lead pins of the sensor body.

The support frame 26 and attached sensor body 16 as described above are received in housing cover 94, as best seen in FIG. 6. The housing cover 94 has an upper enlarged box shaped portion 96 and a lower narrowed rectangular shaped portion 98 which depends centrally from the bottom of the upper portion 96 so that the housing has a compact T-shaped configuration. Both the upper portion 96 and lower portion 98 are open at their rear sides so as to receive the frame 26 and attached sensor body 16 therein. With the frame 26 and sensor body 16 in the housing cover 94, the frame upper portion 52 will be disposed in the corresponding housing upper portion 96 and the frame lower portion 60 will be in the corresponding housing lower portion 98. The frame 26 is sized to tightly fit within the housing cover 94 so that when received therein, the back wall 66 of the frame lower portion 60 will span between lower sections of side walls 100 and 102 of the housing 94, and rear vertical wall 104 of the frame upper portion 52 will also span between the upper sections of the side walls 100 and 102 so that the lower rear wall 66 and upper rear wall 104 of the frame 26 close off the open back of the housing 94 when inserted therein to minimize access of any contaminants into the housing 94, and more specifically to the area 70 where the sensor body 16 is mounted.

The frame support 26 and the housing cover 94 both have open bottoms so that connector pins 106 which depend from the bottom of the sensor body 16 will project from the bottom of the assembled inertia sensor 12 for being connected to an electrical connector 106, as shown in FIG. 4. To mount the sensor 12 in the vehicle interior at a location remote from the retractor 10, the frame 94 is provided with mounting ears 106 and 108 which extend out at right angles from the upper sections of the housing side walls 100 and 102. As previously mentioned, the sensor 12 is to be mounted in the vehicle so that the axis 58 of the conical surface 54 extends in a vertical direction when the vehicle is on a level surface to ensure proper operation of the sensor 12 for keeping the retractor unlocked when vehicle acceleration are within the predetermined range. Any deviation from vertical is to be avoided as that can negatively affect the carefully selected points at which the inertia ball 30 breaks optical communication between the emitter 22 and detector 24 for causing retractor locking.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. A seat belt retractor for a vehicle and having a locking mechanism and including an optical inertia sensor which controls the retractor locking mechanism for locking the retractor against belt protraction, the retractor comprising:

a housing for the inertia sensor and mounted in the vehicle;

a sensor body contained in the housing;

a light emitter mounted to the sensor body to emit light therefrom;

a light detector mounted to the sensor body to receive light from the emitter which is reflected thereto;

an inertia member responsive to inertia forces and having a reflective surface for reflecting light from the emitter to the detector when the inertia member is in a first position where vehicle acceleration or deceleration is within a predetermined range;

a fixed support frame of the housing for supporting the inertia member for movement from the first position to a second position so that the reflective surface no longer reflects light to the light detector; and an electrical circuit operable by the light detector for activating the retractor locking mechanism when the vehicle acceleration/deceleration exceeds the predetermined range limits.

2. The retractor of claim 1 wherein the inertia member is a rolling element and the frame includes inclined walls extending up and away from the rolling element, and an opening in the frame that is covered by the ball until the ball rolls along the inclined walls away from the opening and uncovers the opening.

3. The retractor of claim 1 wherein the sensor body includes first and second bores each including a bore base recessed within the body and a top opening with the emitter mounted at the base of one of the bores to emit light in a first direction along the one bore and out from the top opening thereof and the detector mounted at the base of the other bore so that with the inertia member in its first position light is reflected from the reflecting surface in a second direction different from the first direction through the top opening of the other bore and to the detector at the base thereof.

4. The retractor of claim 3 wherein the support frame includes an opening at a bottom of the support frame, and
inclined walls extending and tapering away from the opening with the sensor ball covering the base opening until the vehicle acceleration exceeds the predetermined range limit.

5. The retractor of claim 1 wherein the inertia element and reflective surface thereof is a ball with an outer spherical surface, and the fixed support frame includes a cup-shaped portion having a substantially conical wall and a base opening smaller than the ball with the ball resting in the base opening at the bottom of the conical wall in the first position and rolling away from the opening along the wall in the second position.

6. An optical inertia sensor for controlling a locking mechanism of a seat belt retractor to lock the retractor against belt protraction, the optical inertia sensor comprising:

a housing for the inertia sensor and mounted in the vehicle;

a sensor body contained in the housing;

a light emitter mounted to the sensor body to emit light in a first direction therefrom;

a light detector mounted to the sensor body to receive light from the emitter which is reflected thereto;

a rolling inertia member responsive to inertia forces and having a reflecting surface for reflecting light from the emitter to the detector in a second direction when the vehicle acceleration or deceleration is within a predetermined range; and a fixed support frame of the housing for supporting the inertia member for rolling movement, the inertia member being restrained against rolling at a predetermined position relative to the support so as to orient the reflecting surface to reflect light from the light emitter for travel in the second direction to the detector, and the inertia member undergoing rolling movement away from the predetermined position with the reflecting surface shifted so that optical communication between the emitter and detector is broken for activating the retractor locking mechanism when the vehicle acceleration/deceleration exceeds the predetermined range limits.

7. The optical inertia sensor of claim 6 wherein the rolling inertial member is a ball with its outer spherical surface being the light reflective surface, and the fixed support frame includes a cup-shaped portion having a tapered substantially conical wall and a base opening with the ball resting at the base opening at the bottom of the conical wall to reflect light from the emitter to the detector and the ball rolls along the wall away from the base opening when the predetermined range of accelerations/decelerations is exceeded to break the optical communication between the emitter and detector.

8. The optical inertia sensor of claim 6 wherein the emitter and detector are mounted in the sensor body to face in the same general direction and slightly canted towards one another so that axes extending in the first and second directions are intersecting.

9. The optical inertia sensor of claim 6 in combination with the retractor locking mechanism which includes a solenoid that is energized to allow belt protraction when the inertia member is in its predetermined position and is de-energized to lock the retractor against belt protraction when the inertia member undergoes rolling movement away from the predetermined position.

10. The combination of claim 9 including a timer which keeps the solenoid energized for belt protraction for a predetermined time responsive to the on/off condition of an ignition of the vehicle and opening of a vehicle door adjacent the retractor with the inertia member in the predetermined position and reflecting light to the detector.

11. The optical inertia sensor of claim 6 wherein the support frame for the inertia member includes an opening having a first predetermined diameter and inclined walls extending up and away from the opening, and the inertia member is a spherical ball having a predetermined second diameter larger than the opening first predetermined diameter so as to seat in the opening for reflecting light from the emitter to the detector with the ratio of the first and second predetermined diameters and the angle of the inclined walls selected to control the limits of the predetermined acceleration/deceleration range at which the ball begins to roll along the walls away from the opening to break optical communication between the emitter and detector.

12. The optical inertia sensor of claim 6 wherein the housing for the sensor is mounted in the vehicle at a remote location from a vehicle seat adjustable backrest to which the retractor is mounted so that the sensor is not affected by changing inclinations of the backrest of the seat.

13. The optical inertia sensor of claim 1 wherein the inertia member is a spherical ball and the support frame includes a conical wall and a base opening in which the ball rests for reflecting light to the detector, and the housing is mounted in the vehicle remote from a vehicle seat so that the conical wall axis extends in a substantially vertical direction when the vehicle is on a relatively level surface.

14. A seat belt restraint system for a vehicle including a seat belt retractor and a remote optical inertia sensor incorporated into a control circuit for the retractor, the seat belt restraint system comprising:

a solenoid associated with the retractor for allowing belt protraction from the retractor when the solenoid is energized by the control circuit and locking the retractor against belt protraction when the solenoid is de-energized;

a timer circuit for signalling the control circuit to energize the solenoid for a predetermined time sufficient for buckling and unbuckling of the seat belt about a passenger who is about to enter or leave the vehicle;

a reflective inertia member in the sensor located in a first position when the vehicle is within predetermined acceleration and deceleration limits;

a light emitter for emitting light in a first direction towards the inertia member so that the light will reflect off the inertia member when it is in the first position; and a light detector for receiving light reflected off the inertia member in a second direction to energize the solenoid for allowing belt protraction, and when the vehicle exceeds the predetermined acceleration/deceleration, the reflective inertia member shifts to break optical communication between the light emitter and detector to de-energize the solenoid for locking of the retractor regardless of signalling from the timer circuit.

15. The seat belt restraint system of claim 14 wherein the optical inertia sensor includes a sensor body having first and second inclined bores therein, and the sensor further includes a support frame including a cup portion having a base opening therein with the sensor body mounted to the frame so that axes of the inclined bores intersect at approximately the base opening of the support frame cup portion, and the light emitter is mounted in the body at the base of the first bore to emit light in the first direction through the first bore and out from the body towards the base opening of the cup and the light detector is mounted in the body at the base of the second bore to receive light reflected off the ball portion in the second direction with the ball resting in the opening.

16. The seat belt system of claim 14 wherein the first and second directions are intersecting, and the sensor includes a support frame having a cup-shaped portion with a base opening so that the inertia member seats in the base opening when in its first position and the first and second directions intersect at approximately the base opening for reflecting off the reflective inertia member thereat.

17. The seat belt restraint system of claim 14 wherein the timer circuit signals the control circuit to energize the solenoid for belt protraction when either an ignition of the vehicle is turned on or off or a vehicle door adjacent the retractor is opened.

18. The seat belt restraint system of claim 14 wherein the reflective inertia member is a reflective spherical ball and the sensor includes a cup support having a substantially conical wall for supporting at the bottom of the cup in the first position whereby the relative size between the ball and the base opening, and the angle of inclination of the conical wall are selected to control the sensitivity of the ball to vehicle accelerations/decelerations thereby setting the limits of the range of accelerations or decelerations at which the ball begins to roll along the conical wall so as to break optical communication between the emitter and detector locking the retractor.

19. The seat belt restraint system of claim 14 wherein the inertia member is a spherical ball and the optical inertia sensor includes an inclined portion for supporting the ball at the bottom of the inclined portion exposed to light from the emitter in the first position, a sensor body with the emitter and detector mounted thereto, and a housing containing the sensor body and the ball and inclined portion to form an inertia sensor module which can be mounted at a remote location from a seat in the vehicle so that an axis of the sensor inclined portion extends in a substantially vertical direction when the vehicle is on a relatively level surface.

* * * * *